No. 770,865. PATENTED SEPT. 27, 1904.
P. MacGAHAN.
THREE PHASE GROUND DETECTOR.
APPLICATION FILED JAN. 20, 1904.
NO MODEL. 2 SHEETS—SHEET 1.

WITNESSES:
C. L. Belcher
Fred. H. Miller.

INVENTOR
Paul MacGahan
BY
Wesley G. Carr
ATTORNEY

No. 770,865. PATENTED SEPT. 27, 1904.
P. MacGAHAN.
THREE PHASE GROUND DETECTOR.
APPLICATION FILED JAN. 20, 1904.
NO MODEL. 2 SHEETS—SHEET 2.

WITNESSES:
C. L. Belcher
Fred. H. Miller

INVENTOR
Paul MacGahan
BY
Wesley G. Carr
ATTORNEY

No. 770,865. Patented September 27, 1904.

UNITED STATES PATENT OFFICE.

PAUL MacGAHAN, OF PITTSBURG, PENNSYLVANIA, ASSIGNOR TO WESTINGHOUSE ELECTRIC & MANUFACTURING COMPANY, A CORPORATION OF PENNSYLVANIA.

THREE-PHASE GROUND-DETECTOR.

SPECIFICATION forming part of Letters Patent No. 770,865, dated September 27, 1904.

Application filed January 20, 1904. Serial No. 189,882. (No model.)

*To all whom it may concern:*

Be it known that I, PAUL MACGAHAN, a citizen of the United States, and a resident of Pittsburg, in the county of Allegheny and State of Pennsylvania, have invented a new and useful Improvement in Three-Phase Ground-Detectors, of which the following is a specification.

My invention relates to instruments for detecting grounds in or defective insulation of electrical systems of distribution; and it has for its object to provide an instrument of the character indicated which shall be applicable to three-phase systems.

In a patent, No. 716,868, granted to the Westinghouse Electric & Manufacturing Company December 30, 1902, as assignee of Frank Conrad, there is described an instrument which is adapted to indicate when a conductor of a single-phase circuit has become grounded, the operation thereof depending upon the electrostatic relations existing between vanes inductively located with reference to each other. This instrument, however, is unsuitable for use in connection with three-phase systems of distribution, and it is the specific object of my invention to provide an instrument which operates similarly, but which is adapted to protect three-phase circuits.

Figure 1:
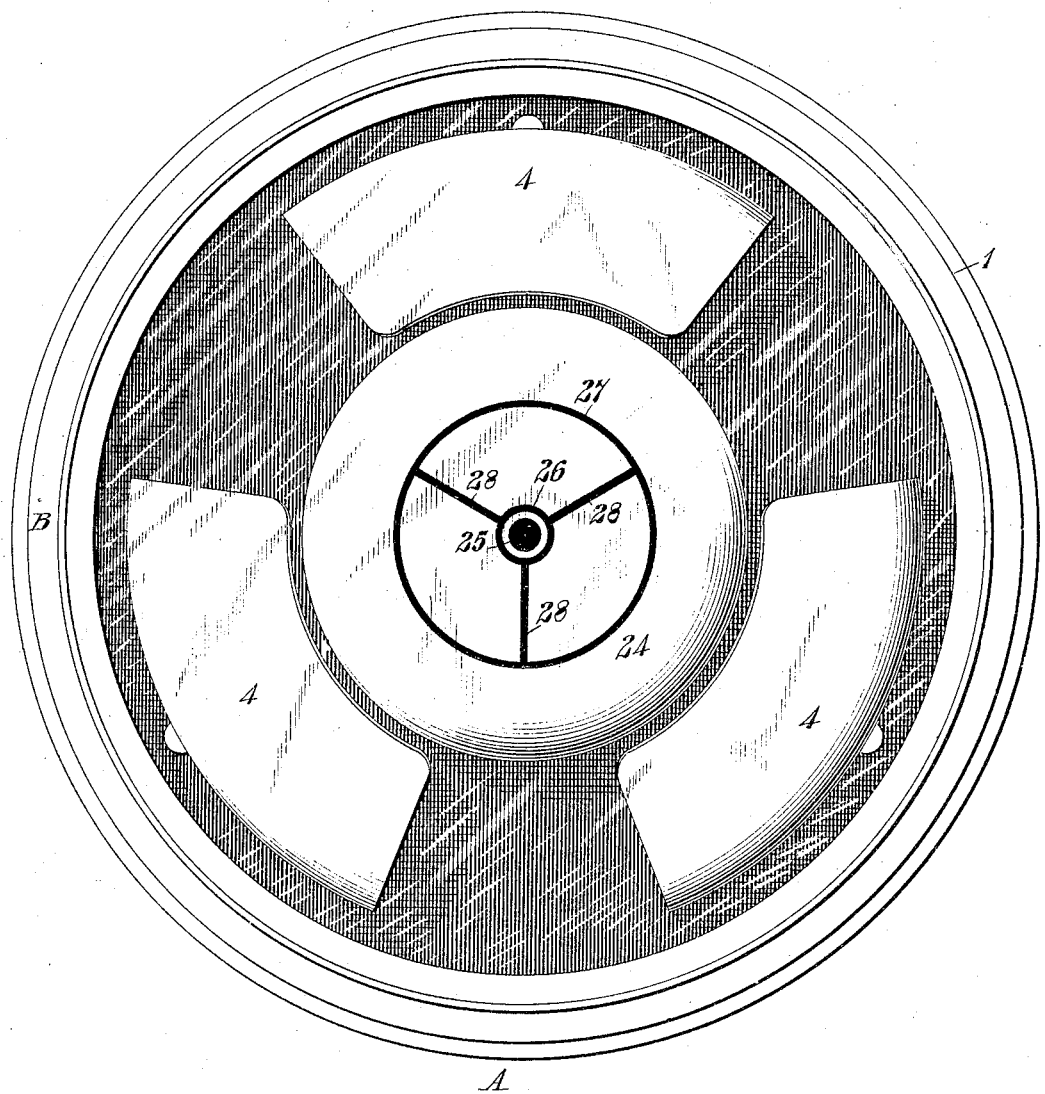
Figure 2:
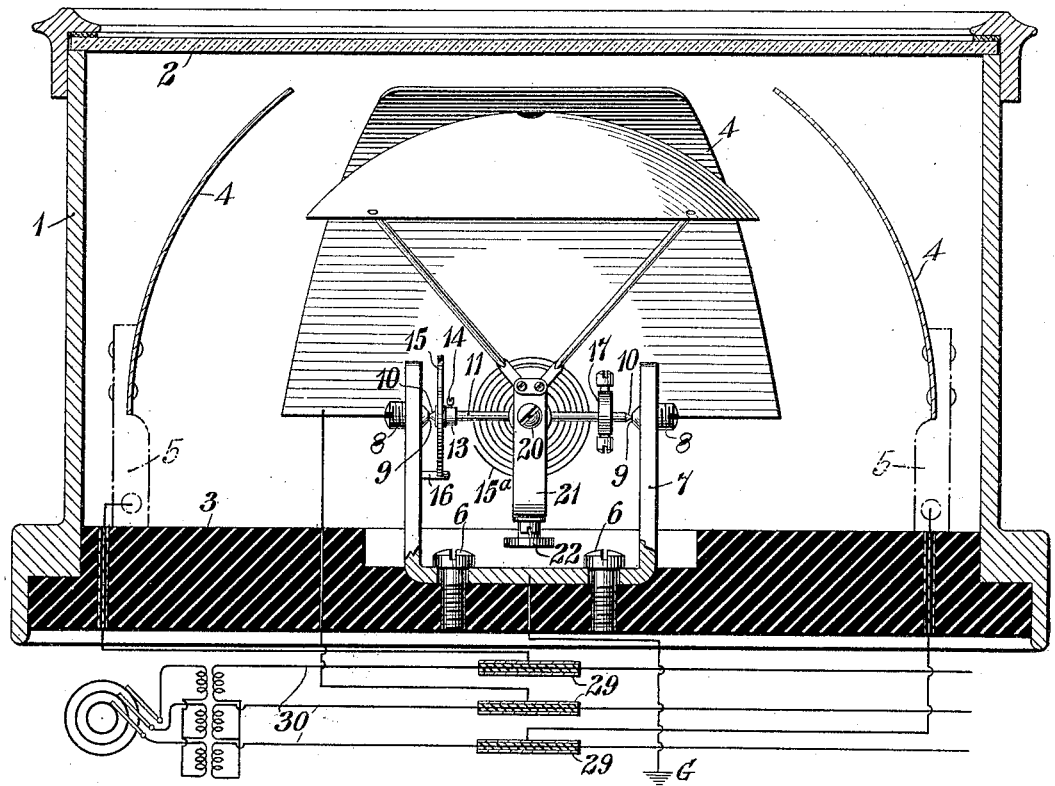
Figure 3:
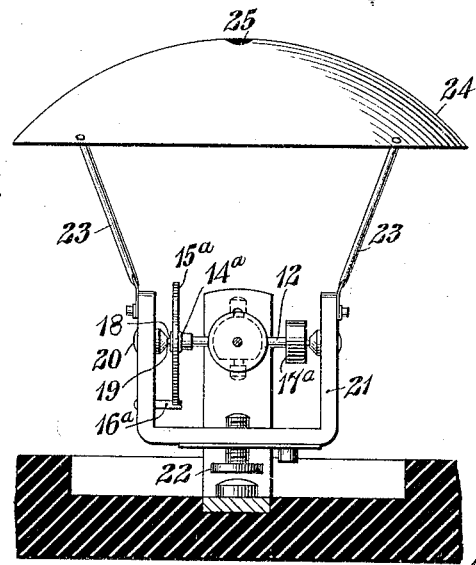

In the accompanying drawings, Figure 1 is a plan or face view of an instrument constructed in accordance with my invention. Fig. 2 is a view in elevation of the operating mechanism of the instrument from the point A of Fig. 1, and as connected to a diagrammatically-indicated system of distribution, the case of the instrument being shown in section; and Fig. 3 is a view in elevation of the movable vane and its mountings from the point B of Fig. 1.

The operating mechanism of the instrument is inclosed in a case 1, having a glass face 2 and a back 3, of suitable insulating material. Three stationary vanes 4, composed of suitable sheet metal and having approximately the form of truncated spherical triangles, are secured to suitable supports 5, which are attached to the back 3 at points approximately equidistant from each other, the convex sides of the vanes 4 having outward exposures.

Secured to the back 3 by means of screws 6 is a U-shaped yoke 7, having adjustable screws 8 near the free ends of its arms. The inner ends of the screws 8 have concave bearing-seats 9 for the reception of the conical ends 10 of a shaft 11, to the middle of which a second shaft 12 is rigidly secured, the two shafts being at right angles to each other. A collar 13 is rigidly fastened to one end of the shaft 11 by means of a set-screw 14, the inner end of a spiral spring 15 being secured thereto and the outer end of said spring being secured to the split end of a pin 16, which is fastened to the adjacent arm of the yoke 7. Near the opposite end of the shaft 11 an adjustable counterweight 17 is provided for balancing the combined weight of the collar 14 and the spring 15. The conical ends 18 of the shaft 12 are seated in the inner concave bearing-seats 19 of the screws 20, which are mounted in the arms of a yoke 21. A collar $14^a$, a spiral spring $15^a$, having its inner end fastened to said collar, a pin $16^a$, to which the outer end of the spring is attached, and a counterweight $17^a$ correspond in structure and function to the like attachments for shaft 11, which have been already described. An adjustable screw 22 is provided in the lower portion of the yoke 21 for balancing the movable mechanism.

Secured to the free ends of the yoke 21 are rods 23, on the outer ends of which a movable vane 24 is mounted, said vanes being in the form of the segment of a spherical shell. In the center of the vane 24 is a spot 25, which by its position with reference to concentric circles 26 and 27 and radial markings 28 on the dial 2 indicates which of the line conductors may have become grounded.

The stationary vanes 4 are severally connected to metallic cylinders 29, which surround the line conductors 30, but are insulated therefrom, and connection to the ground 6 is made in any suitable manner from the movable vane 24.

If the line conductors 30 remain properly insulated from each other and from the ground, the difference of potential between the movable vane 24 and the stationary vanes 4 is always practically the same, so that the spot 25 normally assumes a position concentric with the circle 26; but if any one of the conductors becomes grounded or if the insulation between any two of the conductors becomes seriously damaged the differences of potential between the movable vane and the stationary vanes are no longer equal and the movable vane will assume a position due to the resultant electrostatic effects of the existing electromotive forces—that is, if a single conductor becomes grounded the difference of potential between the stationary vane connected to it and the movable vane becomes zero and the movable vane is attracted by the resultant electrostatic effect of the other two vanes away from the vane which is grounded. The attendant may then know which of the lines has developed a defect in insulation or has become grounded.

I claim as my invention—

1. A ground-detector for three-phase electric circuits comprising three stationary vanes, a movable vane located in inductive relation thereto and means for mounting the movable vane which permits of its movement toward or from any of said stationary vanes.

2. A ground-detector for three-phase electric circuits comprising three stationary vanes, a movable vane located in inductive relation thereto, means for mounting the movable vane which permits of its movement toward or from any of said stationary vanes and means for retarding the motion of said movable member.

3. A ground-detector for three-phase electric circuits comprising three stationary vanes, a movable vane located in inductive relation thereto, means for mounting the movable vane which permits of its movement toward or from any of said stationary vanes, means for retarding the motion of said movable member and means for indicating the grounded circuit.

4. A ground-detector for three-phase electric circuits comprising three stationary vanes and a movable vane mounted on two trunnions which are at right angles to each other.

5. A ground-detector comprising three stationary vanes, a movable vane located in inductive relation thereto and means for mounting the movable vane which permit movement thereof in any direction.

6. A ground-detector for three-phase electric circuits comprising three stationary vanes each inductively related to a different phase of the circuits, and a movable vane inductively related to said stationary vanes and electrically connected to the ground.

7. A ground-detector for three-phase circuits comprising three stationary vanes respectively connected to the line conductors through condensers, a movable, grounded vane inductively related to the stationary vanes, and a universal movement-support for said movable vane.

In testimony whereof I have hereunto subscribed my name this 12th day of January, 1904.

PAUL MacGAHAN.

Witnesses:
 Jos. W. Alexander,
 Birney Hines.